No. 883,940. PATENTED APR. 7, 1908.
C. D. DEARDURFF & B. L. McDONOUGH.
RAILWAY SIGNAL.
APPLICATION FILED MAY 8, 1907.

2 SHEETS—SHEET 1.

Witnesses

Inventors
Chas. D. Deardurff,
B. L. McDonough,
By R. A. R. Lacey,
Attorneys

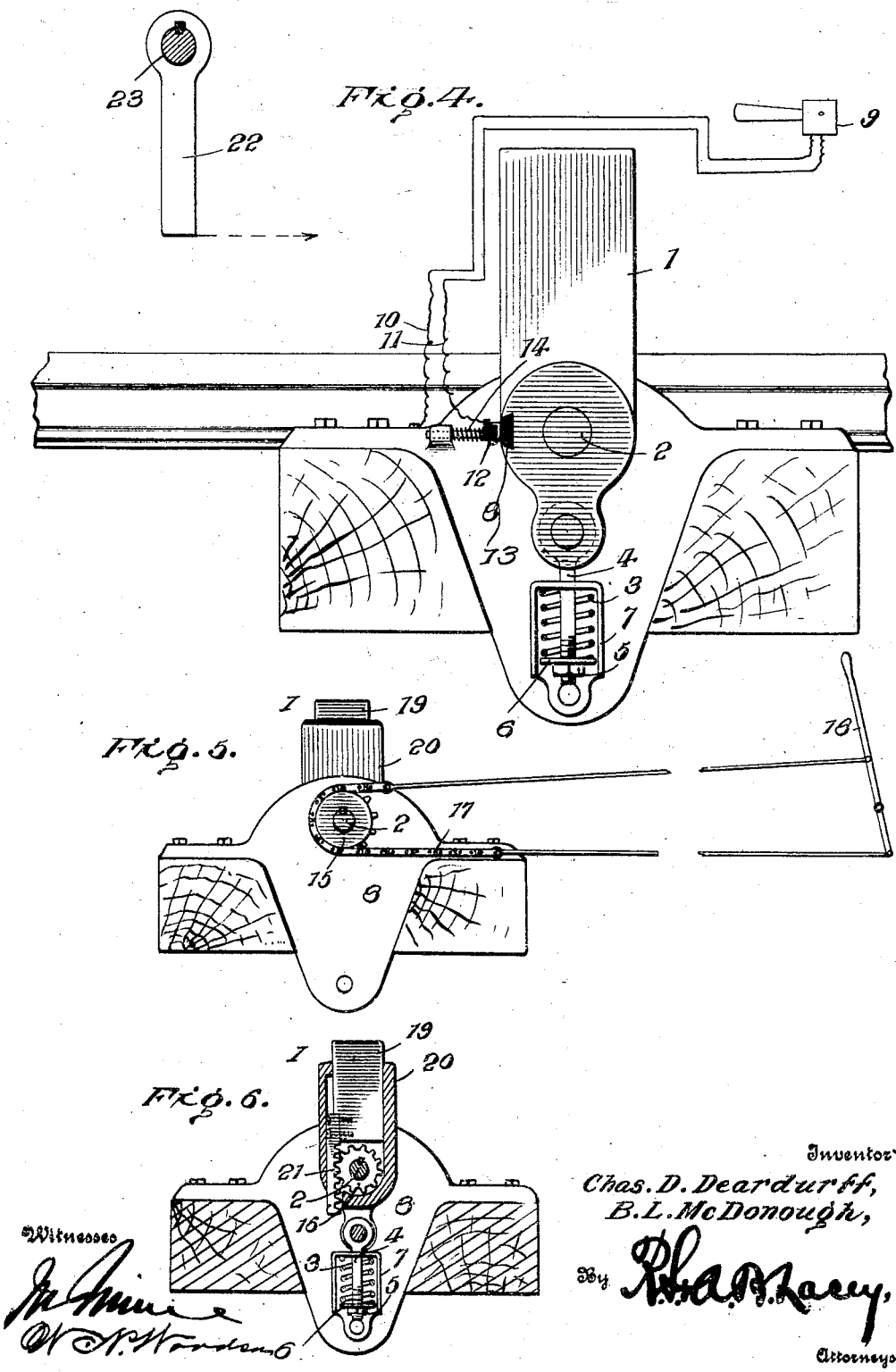

UNITED STATES PATENT OFFICE.

CHARLES D. DEARDURFF AND BERNARD LEO McDONOUGH, OF NEWARK, OHIO.

RAILWAY-SIGNAL.

No. 883,940.  Specification of Letters Patent.  Patented April 7, 1908.

Application filed May 8, 1907. Serial No. 372,624.

*To all whom it may concern:*

Be it known that we, CHARLES D. DEARDURFF and BERNARD LEO McDONOUGH, citizens of the United States, residing at Newark, in the county of Licking and State of Ohio, have invented certain new and useful Improvements in Railway-Signals, of which the following is a specification.

The present invention relates to apparatus for minimizing casualties in the operation of railways.

The invention has for its object to apprise the engineer, motorman or other operator of a car or train whether driven by steam, electricity or other motive power of impending danger, thereby averting a wreck, collision or other injury to the rolling stock and the passengers and goods carried thereby.

The invention contemplates a signal mechanism upon the car, locomotive or other vehicle, a trip mechanism for bringing the signaling means into play, and other means whereby the operator in the tower or at the station may receive a signal when a train or car is approaching and may set a trip so as to automatically operate the signaling means on the approaching car or train so as to give ample warning to the engineer or operator of danger ahead, whereby the car or train may be brought to a standstill.

For a full description of the invention and the merits thereof and also to acquire a knowledge of the details of construction and the means for effecting the result, reference is to be had to the following description and accompanying drawings.

Figure 1:
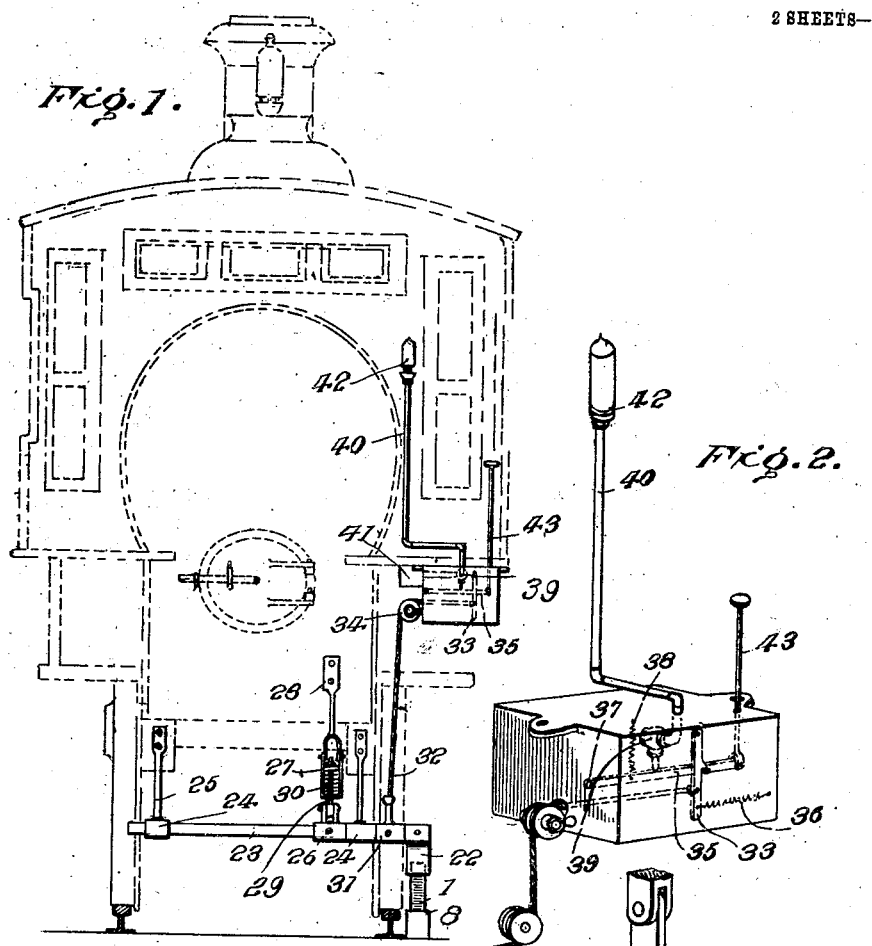
Figure 2:
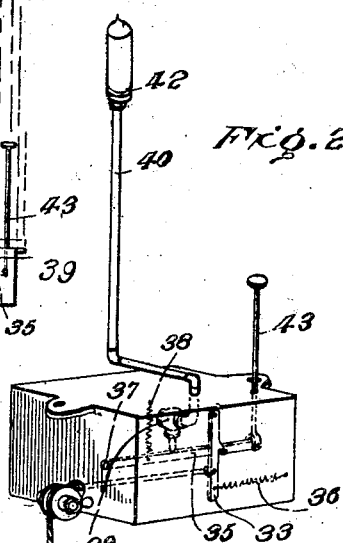
Figure 3:
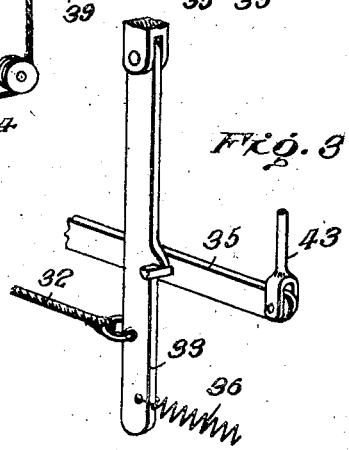

While the invention may be adapted to different forms and conditions by changes in the structure and minor details without departing from the spirit or essential features thereof, still the preferred embodiment is shown in the accompanying drawings, in which:

Figure 1 is a front view of a locomotive engine provided with signal mechanism embodying the invention. Fig. 2 is a detail perspective view of the signal trip and adjunctive parts mounted upon the locomotive engine, car or other vehicle. Fig. 3 is a detail perspective view of the catch and the operating lever. Fig. 4 is a detail view in elevation of one form of track trip showing the train trip arranged to coöperate therewith. Fig. 5 is a modified form of track trip. Fig. 6 is a sectional view of the track trip shown in Fig. 5.

Corresponding and like parts are referred to in the following description and indicated in all the views of the drawings by the same reference characters.

The invention contemplates complemental trips, one applied to the track and the other to the locomotive, car or vehicle. The track trip may be mounted to turn or to have a reciprocating movement imparted thereto. The trip 1 is mounted on a shaft 2 and is held in upright position by means of a spring 3, the latter encircling an eye-bolt 4 and exerting a downward pull upon the lower end of the trip through said eye-bolt. The trip 1 is of the nature of a short bar and is pivotally mounted between its ends as at 2, its lower end being coupled to the upper end of the eye-bolt 4, said eye-bolt having an adjustable stop upon its lower threaded end, the same consisting of a set nut 5 and washer 6. A housing 7 encircles the spring 3 and lower portion of the bolt and protects said parts from injury or interference by any foreign matter such as ice, snow, mud, ballast or the like. A casting 8 supports the track trip and adjunctive parts and is provided at opposite sides with wings which overlap adjacent ties and are spiked or bolted thereto. The spring 3 holds the trip 1 in upright position and admits of the same yielding in either direction so as to ease the impact of the blow incident to the train and track trips coming together.

In order that the operator in the tower or the attendant at the station or other place provided for an attendant, may be advised of the approach of a train, a connection is interposed between the track trip and the tower or station, said connection being preferably an electric conductor by means of which a signal circuit is closed to give warning to the operator. The signal 9 may be of any variety and is included in a circuit comprising wires 10 and 11. The wire 10 is in electric connection with the trip 1 through the frame 8 and shaft 2, whereas the wire 11 is in electric connection with a contact 12 which is electrically insulated from the trip 1 and frame 8. A block 13 of insulating material is applied to the trip 1 and the contact 12 normally bears thereagainst, but when the trip 1 is moved either to the right or to the left, the insulating block 13 is withdrawn from engagement with the contact 12 and the latter makes electric connection with the trip and closes the signal circuit, whereby the operator at the tower or at the station is advised of the approach of a train or car. The contact 12 is spring actuated and is pressed forward towards the trip by means of a spring 14.

In another form of the trip, the shaft 2 is provided with a sprocket wheel 15 and a spur wheel 16 both being fast thereto. A sprocket chain 17 passes around the sprocket wheel 15 and its ends are connected to a lever 18 located in the tower, station or other convenient place for operating the trip when it is desired to project the same into the path of the trip upon the car or other vehicle. Upon moving the lever 18, the sprocket 17 is operated to turn the shaft 2 and to impart rotary movement to the spur wheel 16 which either projects or retracts the trip according to the direction of movement of the lever 18. The trip in the latter case, consists of a block 19 and a frame or casing 20, the latter being loose upon the shaft 2. The block 19 is adapted to slide within said casing and is provided with a rack bar 21 in mesh with the teeth of the spur wheel 16. It will thus be understood that rotation of the shaft 2 in one direction projects the block 19 and rotation in the opposite direction retracts said block. The casing is connected to the frame 8 in substantially the same manner as the trip 1, thereby admitting of the trip turning both to the right and to the left in addition to its reciprocating movement to be projected into the path of the train trip or to be withdrawn from the path of said train trip. This construction admits of the trip being projected by the operator at the station or tower so as to actuate the signal upon the car, locomotive or the like, when it may be required to hold the same at the station for any purpose.

The train trip 22 consists of a projection at or near one end of a rock shaft 23 which is mounted in bearings 24 connected to the locomotive, car or other vehicle. Angularly disposed rods 25 connect the bearings 24 with the car and have screw thread connection with the said bearings to admit of properly positioning the latter as to height and longitudinal disposition to obtain proper position of the shaft and trips. An arm 26 is fast to the rock shaft 23 and has a spring connection with a convenient portion of the locomotive, car or vehicle, to hold the rock shaft 23 and trip 22 in a given position. A clevis 27 has pivotal connection with the forked end of a hanger 28 and receives an eye-bolt 29, the latter having pivotal connection with the arm 26. A spring 30 mounted upon the eye-bolt and confined between the clevis and a stop fitted to the end of an eye-bolt serves to hold the rock shaft and trip in a predetermined position and to return said parts to normal position when actuated and released from the operating means. An arm 31 fast to the rock shaft 22 is connected by cord, chain or analogous connection 32 with a catch 33 which normally holds the signal means in restraint and out of operative position. The flexible connection 32 passes over and around suitable connection pulleys 34. The catch 33 is held in locked engagement with a lever 35 by means of a spring 36. The lever 35 is pivoted at 37 and is acted upon by means of a spring 38. A valve 39 is adapted to be held open by the pressure of the lever 35 when said lever is released from the restraining influence of the catch 33. A valve 39 is interposed in the length of a pipe 40 which has connection with a tank or reservoir 41 for containing compressed air.

A whistle 42 or other type of signal is adapted to be operated by means of the compressed air escaping from the pipe 40 when the valve 39 is open. A push rod 43 when pressed upon depresses the lever 35 and enables the catch 33 to interlock therewith, thereby holding said lever 35 away from the valve 39 which latter automatically closes and shuts off the supply of compressed air to the signal. When the train trip 22 is struck by the track trip, the shaft 23 is rocked and the connection 32 pulled upon, thereby drawing the catch 33 away from the lever 35 which being released moves under the influence of its actuating spring 38 and opens the valve 39 and permits operation of the signal which warns the engineer, motorman or other operator, of impending danger so that opportunity may be afforded to bring the car or train to a standstill or to slacken the speed to such an extent as to obviate a casualty. The signal is of especial advantage when the usual signals are obstructed either by darkness or by fog or smoke or through failure of the ordinary track signals to work.

Having thus described the invention, what is claimed as new is:

1. In combination, a trip mounted to receive an oscillatory movement, a pivoted frame, a connection slidable with reference to the said pivoted frame and having pivotal attachment with the said trip, and a spring interposed between the said connection and frame to hold the trip and parts in normal position.

2. In railway signaling means, the combination of a rock shaft provided with a trip, an eye-bolt having pivotal connection with a part projecting from said shaft, a housing and a spring mounted upon the eye-bolt and confined between a stop thereof and the said housing and normally exerting a pressure to hold the rock shaft and trip in given position.

3. In combination, a rock shaft, a frame mounted upon the rock shaft to have independent movement, a trip slidable with reference to said frame, means for imparting rotary movement to said rock shaft, connecting means between said rock shaft and trip to impart sliding movement to the latter, and a yielding connection between the aforesaid frame and a support to hold said frame in a given position.

4. In combination, a rock shaft, a frame loose upon said rock shaft, a trip slidable in the frame, a rack and pinion connection between said trip and rock shaft, means for imparting a turning movement to the rock shaft either to project or withdraw the said trip, a pivoted frame, a bolt having slidable connection with the pivoted frame, and pivoted connection with the frame loose upon the rock shaft, and a spring interposed between the said pivoted frame and bolt and normally exerting a pressure to hold the parts in given position.

In testimony whereof we affix our signatures in presence of two witnesses.

CHARLES L. DEARDURFF. [L. S.]
BERNARD LEO McDONOUGH. [L. S.]

Witnesses:
M. J. REESE,
PAUL V. HELM.